United States Patent
Gish et al.

(10) Patent No.: US 12,143,541 B2
(45) Date of Patent: *Nov. 12, 2024

(54) SYSTEMS AND METHODS FOR CROSSTALK REDUCTION FOR AUDIO COMMUNICATIONS

(71) Applicant: H.M. Electronics, Inc., Carlsbad, CA (US)

(72) Inventors: Daniel Gish, Carlsbad, CA (US); Charles Butten, Richmond, CA (US)

(73) Assignee: H.M. Electronics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,816

(22) Filed: Aug. 28, 2023

(65) Prior Publication Data

US 2024/0314245 A1    Sep. 19, 2024

Related U.S. Application Data

(63) Continuation of application No. 18/184,849, filed on Mar. 16, 2023, now Pat. No. 11,743,391.

(51) Int. Cl.
| | |
|---|---|
| *H04M 1/60* | (2006.01) |
| *H04M 9/00* | (2006.01) |
| *H04M 9/08* | (2006.01) |
| *H04R 3/14* | (2006.01) |
| *H04S 3/00* | (2006.01) |

(52) U.S. Cl.
CPC ............. *H04M 9/08* (2013.01); *H04R 3/14* (2013.01); *H04S 3/008* (2013.01); *H04S 2400/01* (2013.01)

(58) Field of Classification Search
CPC ............ H04M 9/08; H04R 3/14; H04S 3/008
See application file for complete search history.

(56) References Cited

U.S. PATENT DOCUMENTS

| | | | |
|---|---|---|---|
| 8,126,782 B1 | 2/2012 | Zhu | |
| 8,311,085 B2 | 11/2012 | Albiston | |
| 9,337,898 B2 | 5/2016 | Albiston | |
| 10,244,597 B1 * | 3/2019 | Scott | ........ H04R 1/028 |
| 11,463,491 B2 | 10/2022 | O'Gwynn | |
| 2003/0016770 A1 * | 1/2003 | Trans | ........ H04B 3/32 |
| | | | 375/346 |
| 2010/0082846 A1 | 4/2010 | Kim | |

(Continued)

FOREIGN PATENT DOCUMENTS

WO    9716013 A1    5/1997

*Primary Examiner* — Simon King
(74) *Attorney, Agent, or Firm* — Esplin & Associates, PC

(57) ABSTRACT

Systems and methods for operating a multi-channel intercom system for audio communications between users, with reduced crosstalk, are disclosed. Exemplary implementations may: receive, by a first user station, a modulation carrier signal; capture a first audio signal from a first user, wherein the first audio signal has a first phase; at a rate based on the modulation carrier signal, invert the first phase of the first audio signal to generate a phase-flipped audio signal; transfer the phase-flipped audio signal to a second user station; at a second rate based on the modulation carrier signal, invert a phase of the phase-flipped audio signal to generate an intermediate audio signal; and present a second audio signal based on the intermediate audio signal to the second user.

20 Claims, 5 Drawing Sheets

(56) References Cited

U.S. PATENT DOCUMENTS

| | | |
|---|---|---|
| 2014/0170984 A1 | 6/2014 | Awiszus |
| 2014/0279080 A1 | 9/2014 | O'Gwynn |
| 2016/0041941 A1 | 2/2016 | Kessler |
| 2017/0222829 A1 | 8/2017 | Kessler |
| 2018/0034912 A1 | 2/2018 | Binder |
| 2019/0278733 A1 | 9/2019 | Kessler |
| 2020/0037419 A1* | 1/2020 | Scott .................. H05B 45/60 |
| 2020/0194863 A1 | 6/2020 | Bennett |
| 2022/0094795 A1 | 3/2022 | O'Gwynn |
| 2022/0191634 A1 | 6/2022 | Khelfa |
| 2022/0321241 A1* | 10/2022 | Bennett .................. H01P 3/16 |
| 2022/0417301 A1 | 12/2022 | O'Gwynn |

\* cited by examiner

SYSTEMS AND METHODS FOR CROSSTALK REDUCTION FOR AUDIO COMMUNICATIONS

FIELD OF THE DISCLOSURE

The present disclosure relates to systems and methods for crosstalk reduction for audio communications between users, particularly in the context of multi-channel intercom systems.

BACKGROUND

Intercom systems for multi-user communications are known. Crosstalk in (wired) audio communication systems is known.

SUMMARY

One aspect of the present disclosure relates to a multi-channel intercom system for audio communications between users. The multi-channel intercom system may receive, by a first user station, a modulation carrier signal. The multi-channel intercom system may capture a first audio signal from a first user, wherein the first audio signal has a first phase. In some implementations, the multi-channel intercom system may create a first clock signal based on the modulation carrier signal. The multi-channel intercom system may, at a rate based on the modulation carrier signal, invert the first phase of the first audio signal to generate a phase-flipped audio signal. The multi-channel intercom system may transfer the phase-flipped audio signal to a second user station. The multi-channel intercom system may, at a second rate based on the modulation carrier signal, invert a phase of the phase-flipped audio signal to generate an intermediate audio signal. In some implementations, the multi-channel intercom system may, at a sample rate, sample the intermediate audio signal to generate a second audio signal. The multi-channel intercom system may present a second audio signal based on the intermediate audio signal to the second user, and/or perform other steps.

Another aspect of the present disclosure relates to a method for operating a multi-channel intercom system for audio communications between users. The method may receive, by a first user station, a modulation carrier signal. The method may capture a first audio signal from a first user, wherein the first audio signal has a first phase. In some implementations, the method may create a first clock signal based on the modulation carrier signal. The method may, at a rate based on the modulation carrier signal, invert the first phase of the first audio signal to generate a phase-flipped audio signal. The method may transfer the phase-flipped audio signal to a second user station. The method may, at a second rate based on the modulation carrier signal, invert a phase of the phase-flipped audio signal to generate an intermediate audio signal. In some implementations, the method may, at a sample rate, sample the intermediate audio signal to generate a second audio signal. The multi method may present a second audio signal based on the intermediate audio signal to the second user, and/or perform other steps.

As used herein, any association (or relation, or reflection, or indication, or correspondency) involving communication devices, headsets, ear buds, microphones, loudspeakers, channels, sounds, signals, ports, connectors, conductors, cables, instructions, frequencies, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
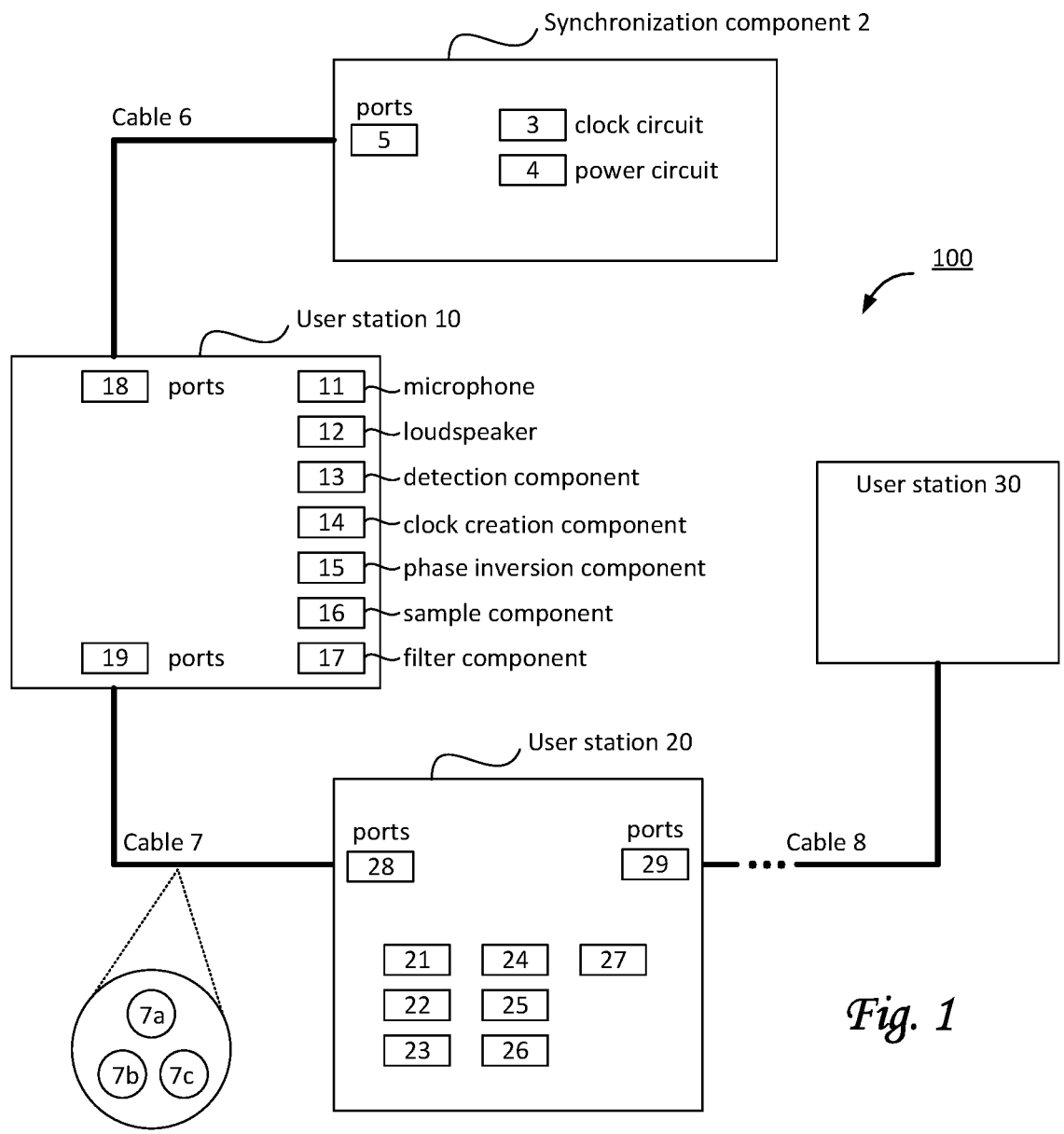
FIG. 1 illustrates a multi-channel intercom system for audio communications between users, in accordance with one or more implementations.

FIG. 1 illustrates a multi-channel intercom system 100 configured for crosstalk reduction for audio communications between users, particularly wired audio communications. Multi-channel intercom system 100 may be referred to as an "intercom communication system", or as an "intercom system". In some implementations, multi-channel intercom system 100 may include a synchronization component 2, one or more user stations such as (first) user station 10, (second) user station 20, and (third) user station 30, multiple cables such as a cable 6, a cable 7, and a cable 8, and/or other components. In some implementations, multi-channel intercom system 100 may implement analog two-channel party line communication, where multiple users can either communicate on channel "A" or channel "B". Party line communications with more than two channels are envisioned within the scope of this disclosure. As multiple bi-directional (or full-duplex) audio channels use the same cable, crosstalk between the channels is common in existing intercom systems (e.g., due to capacitive coupling). In some cases, at cable lengths of about 500 ft, crosstalk can become intelligible in existing intercom systems. By virtue of the systems and methods described in this disclosure, such crosstalk may be reduced by an additional 25-35 dB. In other words, the crosstalk separation between channels may be increased by 25-35 dB, compared to existing intercom systems.

The users of multi-channel intercom system 100 may include employees, staff members or crew members, managers and/or other stakeholders, and/or other groups of people interacting and/or otherwise working together. Multi-channel intercom system 100 may be used in many (professional) contexts where people work together, including but not limited to restaurants, audio-visual production teams, performing arts communications, theme park ride management, construction sites, medical operating room communications, football coach communications, factory floor communications, and/or other contexts.

Synchronization component 2 may include one or more (output) ports 5. Ports 5 may be configured to provide a communication interface, e.g., to one or more user stations such as user station 10 and user station 20. Synchronization component 2 may be configured to generate a modulation carrier signal. In some implementations, synchronization component 2 includes a clock circuit 3 configured to generate a clock signal, a synchronization signal, and/or a modulation carrier signal. In some implementations, synchronization component 2 may include a power circuit 4 configured to generate a power signal and/or otherwise provide power to one or more user stations. Synchronization component 2 may provide the synchronization signal and/or the modulation carrier signal and/or power through one or more ports 5, e.g., to user station 10, e.g., through cable 6. In some implementations, synchronization component 2 may be referred to as a main station, or implemented as part of a main station (in which case it would also include audio circuits, microphone, loudspeaker, etc.). In some implementations, one or more features of synchronization component 2 may be performed by and/or included in one or more user stations. In some implementations, ports 5 may be designed to accommodate an XLR cable, particularly a 3-pin XLR cable or a 4-pin XLR cable. For example, for an XLR-3 connection, one pin/conductor is (shield) ground, one pin/conductor is for power and channel "A" audio, and one pin/conductor is for channel "B" audio.

In some implementations, one or both of the synchronization signal and the modulation carrier signal are sinusoidal signals of at least 20 kHz. A frequency beyond human perception range may be preferred. In some implementations, one or both of the synchronization signal and the modulation carrier signal may be clock signals of at least 20 kHz. A frequency beyond human perception range may be preferred. For example, in some implementations, the modulation carrier signal has a frequency of between 25 kHz and 50 kHz. In some implementations, the modulation carrier signal has a frequency of about 50 kHz. In some implementations, the modulation carrier signal has a frequency of between 50 kHz and 100 kHz. In some implementations, the modulation carrier signal has a frequency of about 100 kHz. In some implementations, the modulation carrier signal has a frequency of between 100 kHz and 200 kHz. Frequencies higher than 200 kHz are envisioned within the scope of this disclosure.

Cable 6 may be configured to couple between ports 5 of synchronization component 2 and (input) ports 18 of user station 10. Cable 7 may be configured to couple between ports 19 of user station 10 and ports 28 of user station 20. Cable 8 may be configured to couple between ports 29 of user station 20 and user station 30. In some implementations, cable 6 includes at least one electrical conductor used to transfer one or more signals from synchronization component 2 to user station 10. In some implementations, cable 6 includes at least one electrical conductor used to transfer power from synchronization component 2 to user station 10 (this may be the same electrical conductor as used for the modulation carrier signal). Each of cable 6, cable 7, and cable 8 may have at least three electrical conductors (so with three connectors at each end, per cable). Connectors may also be referred to as terminals. In some implementations, each of cable 6, cable 7, and cable 8 may be an XLR cable, such as XLR-3 or XLR-4, for example.

Referring to FIG. 1, synchronization component 2 may be configured to communicate with multiple user stations according to a daisy-chain fashion (as depicted), a hub-and-spoke fashion, a point-to-point architecture, and/or other architectures. Users may access multi-channel intercom system 100 via the user stations. The user stations may include (first) user station 10, (second) user station 20, (third) user station 30, and/or other communication devices. First user station 10 may be associated with a first user, second user station 20 may be associated with a second user, third user station 30 may be associated with a third user, and so forth. The user stations may be or include portable communication devices, such as headsets, handhelds, smartphones, belt packs, smart glasses, smart bands, and/or other portable communication devices, which may include one or more earphones and/or headphones.

User station 10 may include a microphone 11, a loudspeaker 12, a detection component 13, a clock creation component 14, a phase inversion component 15, a sample component 16, a filter component 17, (input) ports 18, (output) ports 19, and/or other components. In some implementations, user station 10 may connect to microphone 11 and/or loudspeaker 12. In some implementations, user station 20 may connect to microphone 21 and/or loudspeaker 22. For example, user station 10 may be a belt pack that connects to a headset, which includes microphone 11 and loudspeaker 12. User station 20 may include essentially the same components as user station 10, including a microphone 21, a loudspeaker 22, a detection component 23, a clock creation component 24, a phase inversion component 25, a sample component 26, a filter component 27, (input) ports 28, (output) ports 29, and/or other components.

Microphone 11 and microphone 21 may be configured to capture audio signals from a first and second user, respectively. The first audio signal captured from the first user has a first phase. The second audio signal captured from the second user has a second phase. Loudspeaker 12 and loudspeaker 22 may be configured to present audio signals to the first and second user, respectively.

Ports 18 and ports 19 are configured to provide communication interfaces. As depicted, ports 18 may be coupled, through cable 6, to ports 5 of synchronization component 2. Ports 19 may be coupled, through cable 7, to ports 28 of user station 20. Ports 29 may be coupled, through cable 8, to one or more ports of user station 30. As depicted, cable 7 may include at least three electrical conductors: a first electrical conductor 7a, a second electrical conductor 7b, and a third electrical conductor 7c. User station 10 and user station 20 may be configured to use first electrical conductor 7a of cable 7 for a first bi-directional audio channel (also referred to as channel "A") between user station 10 and user station 20. User station 10 and user station 20 may be configured to use second electrical conductor 7b of cable 7 for a second bi-directional audio channel (also referred to as channel "B") between user station 10 and user station 20. Third electrical conductor 7c may be used as ground. In some cases, this may be the cable shield. In some implementations, both channel "A" and channel "B" could use the same electrical conductor of the same cable, since the audio signals occupy different parts of the frequency spectrum.

Detection component 13 may be configured to detect whether a modulation carrier signal or a synchronization signal is present on ports 18 (e.g., at a predetermined frequency, such as, by way of non-limiting example, 100 kHz). Particularly, detection component 13 may detect the modulation carrier signal or the synchronization signal on the specific port that is coupled to the first electrical conductor of cable 6. Similarly, for user station 20, detection component 23 may detect the modulation carrier signal or the synchronization signal on the specific port (of ports 28) that is coupled to first electrical conductor 7a of cable 7. When no signal is detected, the user stations may operate as typical user stations in a multi-channel intercom system (and transmit and receive audio signals on channel "A" and channel "B"). However, responsive to detection of a modulation carrier signal or a synchronization signal, the audio signals on channel "B" (using the second electrical conductor of the various cables) are modified by phase inversion component 15 and/or phase inversion component 25 as described below.

Figure 3:
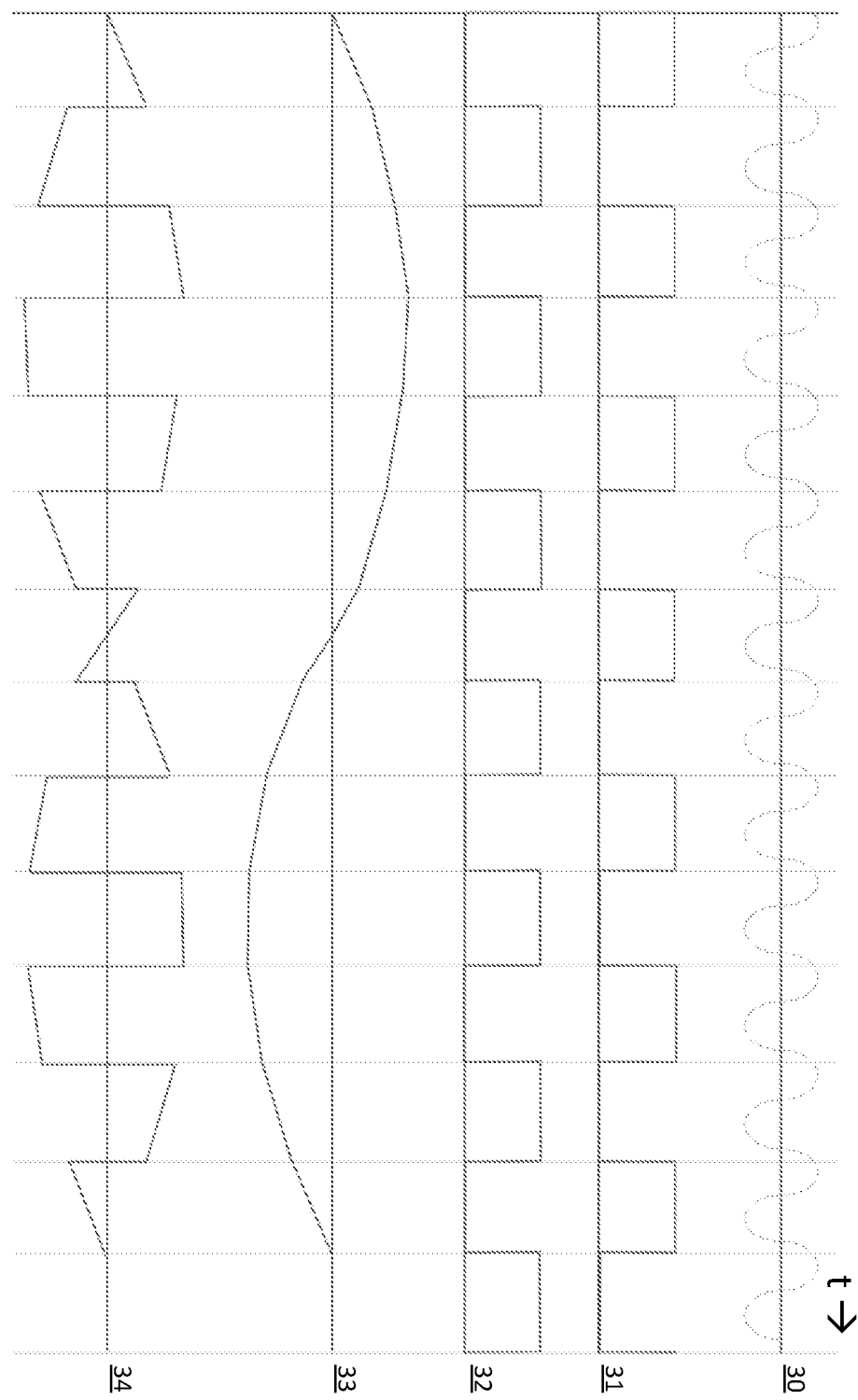
FIG. 3 illustrates exemplary timing diagrams as may be used by a multi-channel intercom system for audio communications between users, in accordance with one or more implementations.
Figure 4:
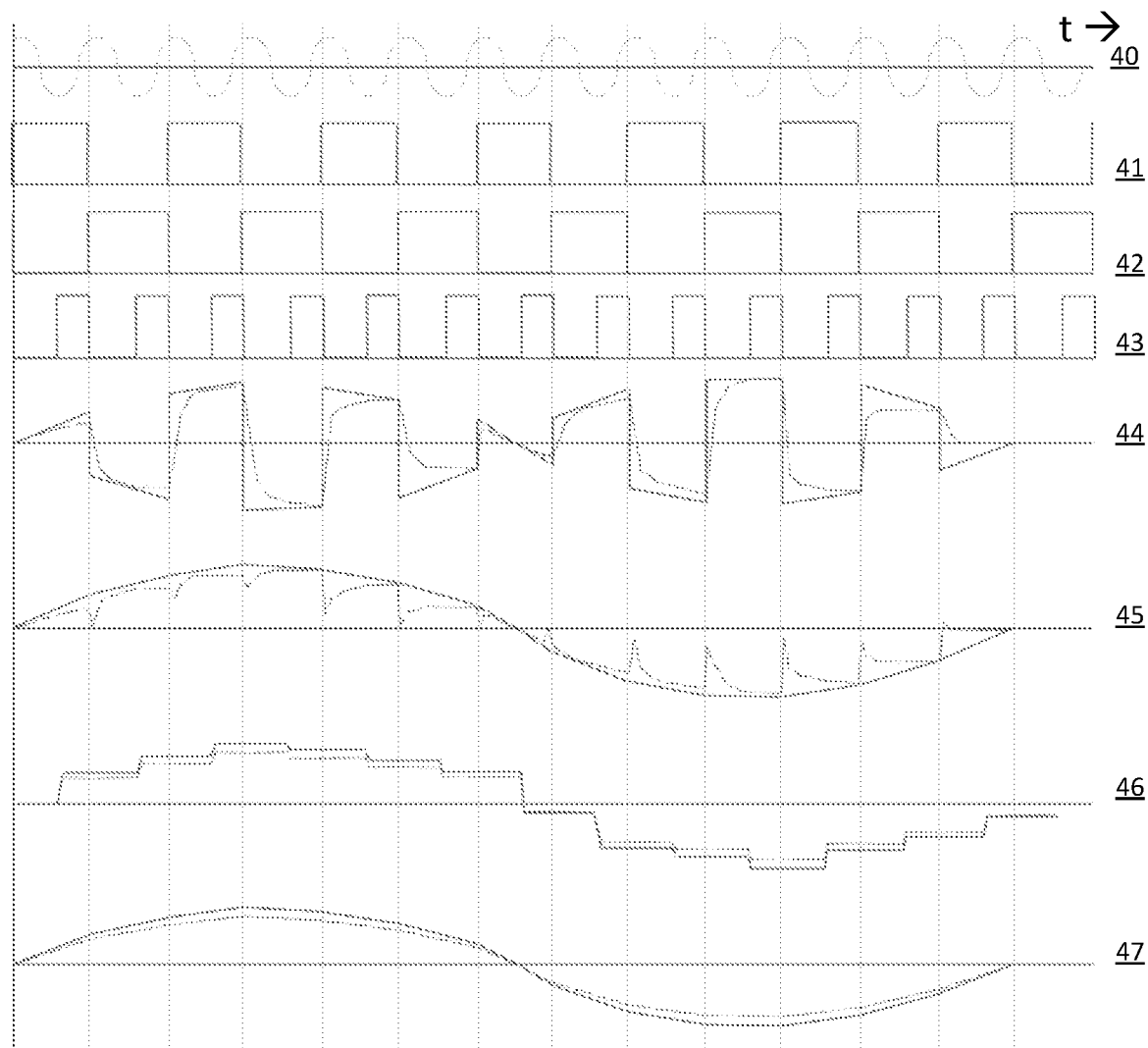
FIG. 4 illustrates exemplary timing diagrams as may be used by a multi-channel intercom system for audio communications between users, in accordance with one or more implementations.

By way of non-limiting example, FIG. 3 illustrates exemplary timing diagrams as may be used by multi-channel intercom system 100, including a timing diagram 30 depicting a modulation carrier signal (e.g., at 100 kHz) detected by detection component 13. By way of non-limiting example, FIG. 4 illustrates exemplary timing diagrams as may be used by multi-channel intercom system 100, including a timing diagram 40 depicting a modulation carrier signal (e.g., at 100 kHz) detected by detection component 23 of user station 20.

Clock creation component 14 and clock creation component 24 may be configured to create one or more clock signals based on the modulation carrier signal, responsive to detection by detection component 13 and/or detection component 23, respectively. For example, clock creation component 14 may be configured to create a first clock signal and/or a second clock signal based on the modulation carrier signal. For example, for a 100 kHz modulation carrier signal, the first clock signal may be a 50 kHz clock signal as shown by timing diagram 31 in FIG. 3, and the second clock signal may be another 50 kHz clock signal as shown by timing diagram 32 in FIG. 3, which may be inverted from the first clock signal (or have the opposite phase of the first clock signal). At user station 20, for example, the first clock signal may be a 50 kHz clock signal as shown by timing diagram 41 in FIG. 4, the second clock signal may be another 50 kHz clock signal as shown by timing diagram 42 in FIG. 4, and a third clock signal (also referred to as a sample clock signal) may be a 100 kHz clock signal as shown by timing diagram 43 in FIG. 4.

Phase inversion component 15 and/or phase inversion component 25 may be configured to invert the phase of an audio signal. Phase inversion component 15 and/or phase inversion component 25 may toggle and/or alternate between inverting and not inverting the phase of the audio signal at a particular rate or frequency, and this rate or frequency may correspond to a particular clock signal (e.g., as created by clock creation component 14 and/or clock creation component 24, such phase inversion may be considered a type of square wave modulation). Other types of modulation using the modulation carrier signal are envisioned within the scope of this disclosure, including but not limited to double side band suppressed carrier (DSB-SC) modulation, quadrature amplitude modulation, other types of amplitude modulation, and/or other types of modulation. In some implementations, phase inversion of an audio signal may be controlled by a particular clock signal. The audio signal generated by phase inversion component 15 and/or phase inversion component 25 may be referred to as a phase-flipped audio signal or an intermediate audio signal, respectively. For example, for a captured audio signal as shown by timing diagram 33 in FIG. 3, the generated phase-flipped audio signal may be shown by timing diagram 34 in FIG. 3. This phase-flipped audio signal may be transferred from user station 10 via second electrical conductor 7b to user station 20. Accordingly, the audio signal transferred on channel "B" (going to user station 20) has been modified by phase inversion component 15. As used herein, phase inversion of (regular, audible) audio signals may be referred to as encoding, and phase inversion of a previously phase-flipped audio signal may be referred to as decoding. The audio signal from user station 10 to user station 20 is thus encoded by phase inversion component 15 and decoded by phase inversion component 25. Simultaneously, a different audio signal from user station 20 to user station 10 is thus encoded by phase inversion component 25 and decoded by phase inversion component 15, thereby establishing a full-duplex bi-directional audio channel using the same electrical conductor in a particular cable. Meanwhile, a different full-duplex bi-directional audio channel uses another electrical conductor in the same particular cable.

Phase inversion component 25 may take the phase-flipped audio signal from user station 10 as input (shown by timing diagram 44 in FIG. 4) and generate an intermediate audio signal (shown by timing diagram 45 in FIG. 4) by toggling and/or alternating between inverting and not inverting the phase of the input audio signal at a particular rate or frequency, and this rate or frequency may correspond to a particular clock signal (e.g., clock signal 42 as created by clock creation component 24). In FIG. 4, the dotted lines illustrate realistic timing diagrams while the solid lines illustrate the ideal timing diagrams.

In some implementations, audio signals on one or more channels could be companded (e.g., by compressing the dynamic range) before phase inversion (for encoding) and after the inverse phase inversion (for decoding) to increase signal-to-noise ratio. In some implementations, multiple channels could be multiplexed by shifting the timing of phase inversion by % of the corresponding clock cycle. In some implementations, responsive to detection of the synchronization signal and/or the modulation carrier signal, system 100 may set the gain for automatic gain correction to compensate for attenuation along the cables. In some implementations, system 100 may include repeater-amplifiers (not depicted in FIG. 1) to amplify (audio) signals between long cables, e.g., every 1000 ft.

Sample component 16 and/or sample component 26 may be configured to sample and hold an intermediate audio signal (e.g., as generated by phase inversion component 25) at a particular rate or frequency. For example, sample component 26 may operate as controlled by a sample clock signal, as shown by timing diagram 43 in FIG. 4. Sample component 26 may generate an audio signal (as shown by timing diagram 46 in FIG. 4), which may be presented to a user. In some implementations, this audio signal may be filtered by filter component 27 prior to being presented to a user.

Filter component 17 and/or filter component 27 may be configured to filter audio signals to remove artefacts resulting from modulation and/or encoding. For example, filter component 27 may take an audio signal as input (as shown by timing diagram 46 in FIG. 4) and produce a cleaner and/or smoother audio signal as output (as shown by timing diagram 47 in FIG. 4) that is subsequently presented to a user.

Measurements show that using unmodified audio on channel "A" and encoded/decoded audio on channel "B" increases the crosstalk separation by about 25-35 dB (for a total crosstalk separation of about 35-45 dB) when compared to using unmodified audio on both channel "A" and channel "B", for a 500 ft cable length.

In some implementations, one or more features attributed herein to synchronization component 2 may be implemented as part of one or more of the user stations. For example, a certain type of user stations may be configured to generate a synchronization signal and/or a modulation carrier signal.

In some implementations, detection component 13, clock creation component 14, phase inversion component 15, sample component 16, and filter component 17 may be implemented as analog circuitry. Similarly, for user station 20, detection component 23, clock creation component 24, phase inversion component 25, sample component 26, and filter component 27 may be implemented as analog circuitry. In other implementations, one or more of detection component 13, clock creation component 14, phase inversion component 15, sample component 16, and filter component 17 may be implemented as a digital circuit, including but not limited to a digital signal processor (DSP) and/or a hardware processor configured by machine-readable instructions to perform the features attributed herein to one or more of detection component 13, clock creation component 14, phase inversion component 15, sample component 16, and filter component 17. Similarly, for user station 20, one or more of detection component 23, clock creation component 24, phase inversion component 25, sample component 26, and filter component 27 may be implemented as a digital circuit, including but not limited to a digital signal processor (DSP) and/or a hardware processor configured by machine-readable instructions to perform the features attributed herein to one or more of detection component 23, clock creation component 24, phase inversion component 25, sample component 26, and filter component 27.

Figure 2A:
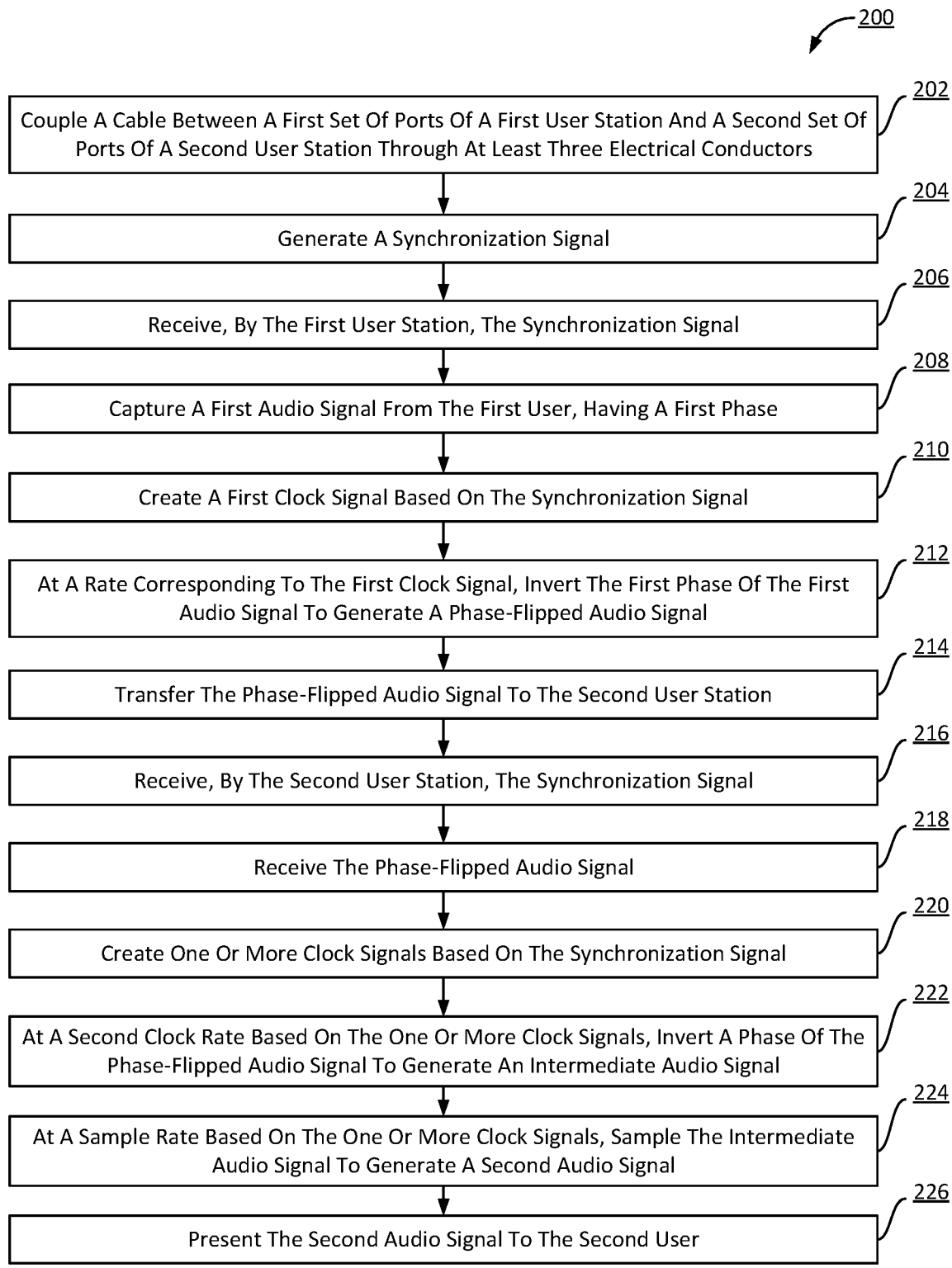
FIG. 2A illustrates a method for operating a multi-channel intercom system for audio communications between users, in accordance with one or more implementations.

FIG. 2A illustrates a method 200 of operating a multi-channel intercom system for audio communications between users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2A and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a cable is coupled between a first set of ports of a first user station and a second set of ports of a second user station through at least three electrical conductors, including a first electrical conductor, a second electrical conductor, and a third electrical conductor. In some embodiments, operation 202 is performed by a cable the same as or similar to cable 7 (shown in FIG. 1 and described herein).

At an operation 204, a synchronization signal is generated. In some embodiments, operation 204 is performed by a synchronization component the same as or similar to synchronization component 2 (shown in FIG. 1 and described herein).

At an operation 206, the synchronization signal is received. In some embodiments, operation 206 is performed by a user station (through the first set of ports included in the user station) the same as or similar to user station 10 (shown in FIG. 1 and described herein).

At an operation 208, a first audio signal from the first user is captured. The first audio signal has a first phase. In some embodiments, operation 208 is performed by a microphone the same as or similar to microphone 11 (shown in FIG. 1 and described herein).

At an operation 210, a first clock signal is created based on the synchronization signal. In some embodiments, operation 210 is performed by a clock creation component the same as or similar to clock creation component 14 (shown in FIG. 1 and described herein).

At an operation 212, the first phase of the first audio signal is inverted at a rate corresponding to the first clock signal, to generate a phase-flipped audio signal. In some embodiments, operation 212 is performed by a phase inversion component the same as or similar to phase inversion component 15 (shown in FIG. 1 and described herein).

At an operation 214, the phase-flipped audio signal is transferred to the second user station. In some embodiments, operation 214 is performed by an electrical conductor the same as or similar to second electrical conductor 7b (shown in FIG. 1 and described herein).

At an operation 216, the synchronization signal is received. In some embodiments, operation 216 is performed by a user station (through a set of ports included in the user station) the same as or similar to user station 20 (shown in FIG. 1 and described herein).

At an operation 218, the phase-flipped audio signal is received. In some embodiments, operation 218 is performed by a user station the same as or similar to user station 20 (shown in FIG. 1 and described herein).

At an operation 220, one or more clock signals are created based on the synchronization signal. In some embodiments, operation 220 is performed by a clock creation component the same as or similar to clock creation component 24 (shown in FIG. 1 and described herein).

At an operation 222, a phase of the phase-flipped audio signal is inverted at a second clock rate based on the one or more clock signals, to generate an intermediate audio signal. In some embodiments, operation 222 is performed by a phase inversion component the same as or similar to phase inversion component 25 (shown in FIG. 1 and described herein).

At an operation 224, the intermediate audio signal is sampled at a sample rate based on the one or more clock signals, to generate a second audio signal. In some embodiments, operation 224 is performed by a sample component the same as or similar to sample component 26 (shown in FIG. 1 and described herein).

At an operation 226, the second audio signal is presented to the second user. In some embodiments, operation 226 is performed by a loudspeaker the same as or similar to loudspeaker 22 (shown in FIG. 1 and described herein).

Figure 2B:
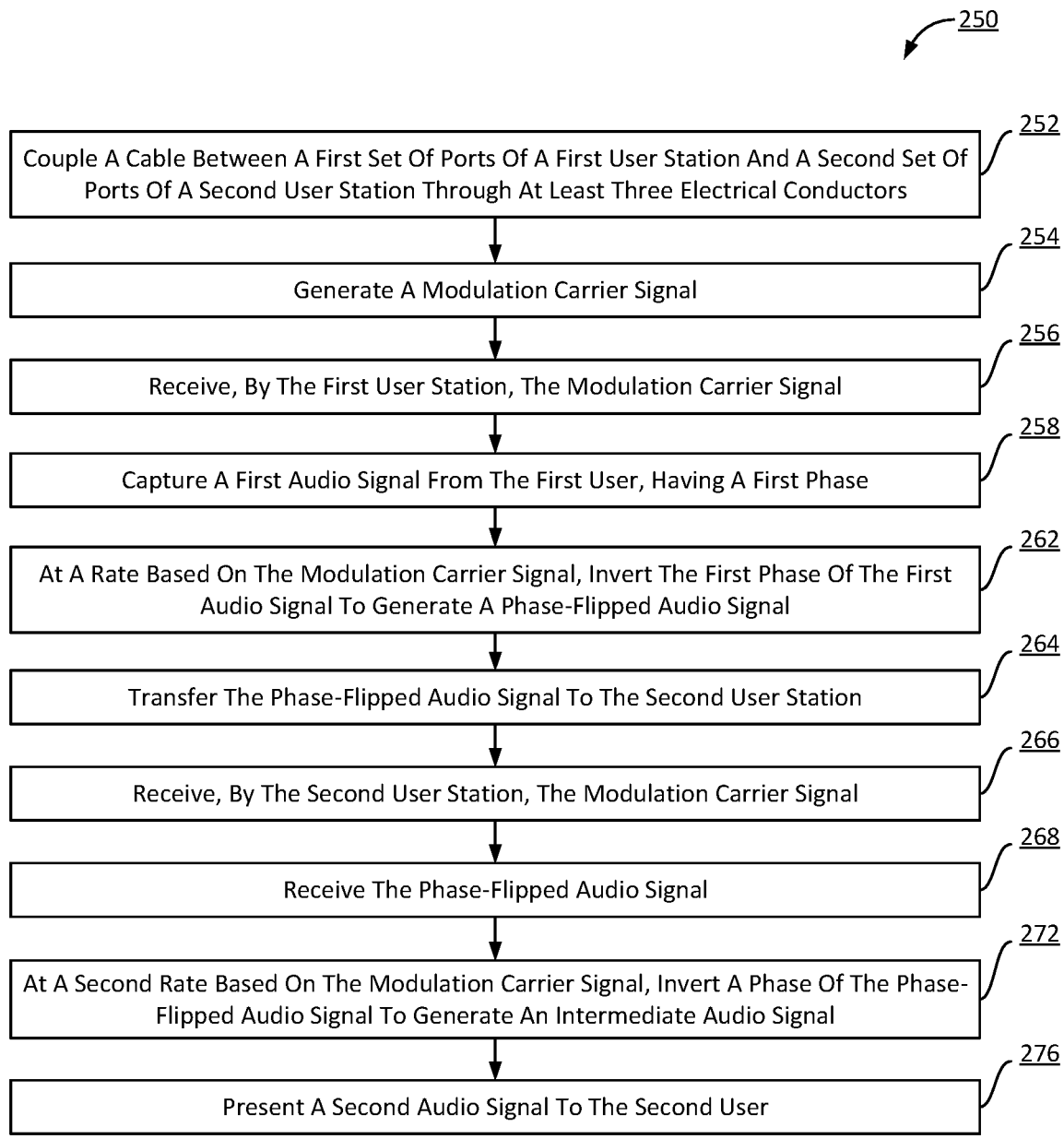
FIG. 2B illustrates a method for operating a multi-channel intercom system for audio communications between users, in accordance with one or more implementations.

FIG. 2B illustrates a method 250 of operating a multi-channel intercom system for audio communications between users, in accordance with one or more implementations. The operations of method 250 presented below are intended to be illustrative. In some implementations, method 250 may be accomplished with one or more additional operations not described, and/or without one or more of the operations discussed. Additionally, the order in which the operations of method 250 are illustrated in FIG. 2B and described below is not intended to be limiting.

In some implementations, method 250 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 250 in response to instructions stored electronically on an electronic storage medium. The one or more processing devices may include one or more devices configured through hardware, firmware, and/or software to be specifically designed for execution of one or more of the operations of method 250.

At an operation 252, a cable is coupled between a first set of ports of a first user station and a second set of ports of a second user station through at least three electrical conductors, including a first electrical conductor, a second electrical conductor, and a third electrical conductor. In some embodiments, operation 252 is performed by a cable the same as or similar to cable 7 (shown in FIG. 1 and described herein).

At an operation 254, a modulation carrier signal is generated. In some embodiments, operation 254 is performed by a synchronization component the same as or similar to synchronization component 2 (shown in FIG. 1 and described herein).

At an operation 256, the modulation carrier signal is received. In some embodiments, operation 256 is performed by a user station (through the first set of ports included in the user station) the same as or similar to user station 10 (shown in FIG. 1 and described herein).

At an operation 258, a first audio signal from the first user is captured. The first audio signal has a first phase. In some embodiments, operation 258 is performed by a microphone the same as or similar to microphone 11 (shown in FIG. 1 and described herein).

At an operation 262, the first phase of the first audio signal is inverted at a rate based on the modulation carrier signal, to generate a phase-flipped audio signal. In some embodiments, operation 262 is performed by a phase inversion component the same as or similar to phase inversion component 15 (shown in FIG. 1 and described herein).

At an operation 264, the phase-flipped audio signal is transferred to the second user station. In some embodiments, operation 264 is performed by an electrical conductor the same as or similar to second electrical conductor 7b (shown in FIG. 1 and described herein).

At an operation 266, the modulation carrier signal is received. In some embodiments, operation 266 is performed by a user station (through a set of ports included in the user station) the same as or similar to user station 20 (shown in FIG. 1 and described herein).

At an operation 268, the phase-flipped audio signal is received. In some embodiments, operation 268 is performed by a user station the same as or similar to user station 20 (shown in FIG. 1 and described herein).

At an operation 272, a phase of the phase-flipped audio signal is inverted at a second rate based on the modulation carrier signal, to generate an intermediate audio signal. In some embodiments, operation 272 is performed by a phase inversion component the same as or similar to phase inversion component 25 (shown in FIG. 1 and described herein).

At an operation 276, a second audio signal based on the intermediate audio signal is presented to the second user. In some embodiments, operation 276 is performed by a loudspeaker the same as or similar to loudspeaker 22 (shown in FIG. 1 and described herein.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A multi-channel intercom system configured for crosstalk reduction for audio communications between users, wherein the users include a first user and a second user, the system comprising:
a synchronization component including one or more ports and a clock circuit configured to generate a modulation carrier signal, wherein the one or more ports are configured to provide a communication interface;
a first user station including a first loudspeaker and a first set of ports, wherein the first set of ports is configured to provide a first communication interface; and
a second user station including a second loudspeaker and a second set of ports, wherein the second set of ports is configured to provide a second communication interface, wherein a cable is configured to couple between the first set of ports of the first user station and the second set of ports of the second user station,
wherein the first user station and the second user station are configured to:
(i) use the cable for a first bi-directional audio channel between the first user station and the second user station, and
(ii) use the cable for a second bi-directional audio channel between the first user station and the second user station that is different from the first bi-directional audio channel,
wherein the first user station is further configured to:
(i) receive the modulation carrier signal;
(ii) at a rate based on the modulation carrier signal, invert a first phase of a first audio signal from the first user to generate a phase-flipped audio signal; and (iii) transfer the phase-flipped audio signal through the cable to the second user station; and wherein the second user station is further configured to:
(i) receive the phase-flipped audio signal;
(ii) at a second rate based on the modulation carrier signal, invert a phase of the phase-flipped audio signal to generate an intermediate audio signal; and
(iii) present, using the second loudspeaker, a second audio signal based on the intermediate audio signal to the second user.

2. The multi-channel intercom system of claim 1, wherein the cable includes multiple electrical conductors.

3. The multi-channel intercom system of claim 2, wherein the first bi-directional audio channel uses a different electrical conductor than the second bi-directional audio channel.

4. The multi-channel intercom system of claim 2, wherein the first user station and the second user station are further configured to simultaneously transfer and receive audio signals through a first electrical conductor of the cable.

5. The multi-channel intercom system of claim 1, wherein the synchronization component is configured to provide the modulation carrier signal to one or both of the first user station and the second user station.

6. The multi-channel intercom system of claim 1, wherein the first user station includes a microphone configured to capture the first audio signal.

7. The multi-channel intercom system of claim 1, wherein the second user station is further configured to receive and detect the modulation carrier signal.

8. The multi-channel intercom system of claim 1, wherein the first user station provides the modulation carrier signal to the second user station.

9. The multi-channel intercom system of claim 1, wherein the modulation carrier signal has a frequency of at least 20 kHz.

10. The multi-channel intercom system of claim 1, wherein crosstalk between the first bi-directional audio channel and the second bi-directional audio channel is reduced due to phase-inversion of the first audio signal.

11. A method of operating a multi-channel intercom system for audio communications between users, with reduced crosstalk, wherein the users include a first user and a second user, wherein the multi-channel intercom system includes a synchronization component that generates a modulation carrier signal, a first user station, and a second user station, the method comprising:

coupling a cable between a first set of ports of the first user station and a second set of ports of the second user station;

receiving, by the first user station through the first set of ports included in the first user station, the modulation carrier signal;

at a rate based on the modulation carrier signal, inverting a first phase of a first audio signal from the first user to generate a phase-flipped audio signal;

transferring the phase-flipped audio signal through the cable to the second user station;

at a second rate based on the modulation carrier signal, inverting a phase of the phase-flipped audio signal to generate an intermediate audio signal; and presenting, by a second loudspeaker included in the second user station, a second audio signal based on the intermediate audio signal to the second user.

12. The method of claim 11, further comprising:
capturing, by a microphone, the first audio signal.

13. The method of claim 11, wherein the phase of the phase-flipped audio signal is inverted by the second user station.

14. The method of claim 11, wherein the cable includes multiple electrical conductors.

15. The method of claim 11, wherein the synchronization component provides the modulation carrier signal to one or both of the first user station and the second user station.

16. The method of claim 11, further comprising:
providing, by the first user station, the modulation carrier signal to the second user station.

17. The method of claim 11, further comprising:
simultaneously transferring and receiving audio signals through a first electrical conductor of the cable.

18. The method of claim 11, wherein the modulation carrier signal has a frequency of at least 20 kHz.

19. The method of claim 11, wherein crosstalk between a first bi-directional audio channel in the cable and a second bi-directional audio channel in the cable is reduced due to phase-inversion of the first audio signal.

20. The method of claim 19, wherein the main station provides the power through one of the one or more ports.

* * * * *